C. V. STATLER.
Device for Shrinking Tires.
No. 45,872.
Patented Jan. 10, 1865.
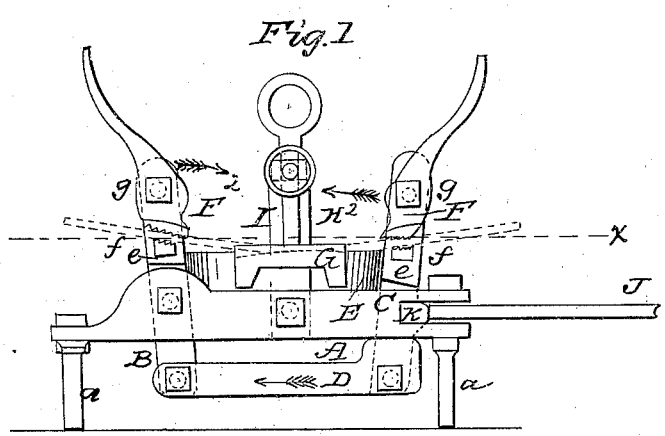
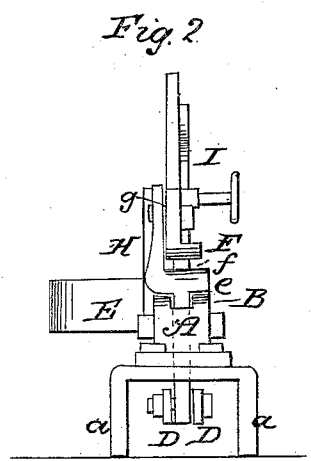
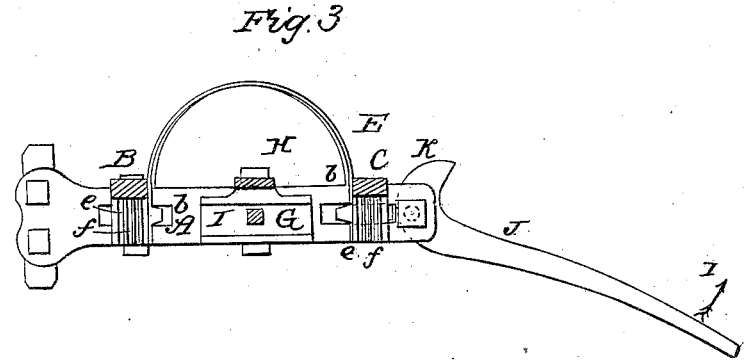

UNITED STATES PATENT OFFICE.

C. V. STATLER, OF WATAGA, ILLINOIS.

IMPROVED DEVICE FOR SHRINKING TIRES.

Specification forming part of Letters Patent No. 45,872, dated January 10, 1865.

*To all whom it may concern:*

Be it known that I, C. V. STATLER, of Wataga, in the county of Knox and State of Illinois, have invented a new and Improved Device for Shrinking Tires; and I do hereby declare that the following is a full, clear, and exact description thereof, which will enable those skilled in the art to make and use the same, reference being had to the accompanying drawings, forming a part of this specification, in which—

Figure 1 is a front view of my invention; Fig. 2, an end view of the same; Fig. 3, a horizontal section of the same, taken in the line *x x*, Fig. 1.

Similar letters of reference indicate like parts.

This invention relates to a new and improved implement or device for upsetting or contracting tires for wheels, so that the former may, in case of the wheels shrinking, be reduced in diameter so as to be adjusted snugly on the latter without the trouble of cutting and re-welding—a comparatively tedious and expensive process.

A represents a horizontal bed, which may be of cast-iron, and is supported at a suitable height by legs *a*, or any suitable framing. This bed has two slots, *b b'*, made vertically through it, in one of which, *b*, a bar, B, is fitted and secured by a pivot-bolt, *c*, on which it is allowed to work or swing freely. A similar bar, C, is fitted in the slot *b'*, and is supported by a shoulder. This bar C does not work on a pivot like the bar B, but is allowed to slide freely in its slot *b'*. The lower ends of the two bars B C are connected by two parallel bars, D D. The two bars B C above the bed A have a tendency to be kept distended or forced apart by means of a spring, E, of semicircular form. On each bar B C there is a horizontal ledge or bearing, *e*, in which a corrugated steel die, *f*, is fitted, and to each of these bars, above the ledges or bearings *e*, there are secured by pivots *g* clamps F, the under or face sides of which are also corrugated.

On the bed A there is placed a rest or bearing, G, which is grooved longitudinally on its upper surface, and has an upright, H, at one side, the upper end of which is bent over horizontally, and is perforated to admit of a bar, I, passing vertically through it. This bar may be retained at any desired height by means of a set-screw, *h*. In one end of the bed A there is secured by a fulcrum pin, *i*, a lever, J, the inner end of which is made in the form of a cam, K, the latter bearing against the bar C.

The operation is as follows: The tire to be upset or contracted is heated at the proper or desired point, and the heated portion laid on the bearings G and dies *f* in the ledges or bearings *e e*, (see Fig. 1, in which the tire is shown in red,) the bar I being let down in contact with the tire to prevent the same from kinking or bending upward. The lever J is then moved in the direction of the arrow 1, and the cam K acts upon the bar C, causing the two clamps F F to bind the tire firmly on the dies *f f*, and approach each other, (see arrows 2, Fig. 1,) so as to cause the heated portion between the clamps to be upset and shrunk. The bar I, as before stated, preserves the proper curve of the tire under the upsetting operation, and a powerful leverage is obtained, owing to the arrangement of the bars B C and lever J.

I am aware that machines for upsetting tires provided with clamps to grasp the tire at each side of the heated portion, and so arranged as to be moved toward each other through the medium of a lever, have been previously used; but, so far as I am aware, they have all been arranged differently from my machine herein described, requiring more power to operate them, and not working as expeditiously.

I claim as new and desire to secure by Letters Patent—

The two bars B C, one, B, fitted in the bed A by a pivot-bolt, *c*, and the other, C, arranged so as to slide therein, and the two bars connected at their lower ends by one or more bars, D, and provided above the bed with the dies *f f*, in combination with the clamps F F, pivoted to the bars B C, the spring E, and lever J, provided with the cam K, all arranged to operate in the manner substantially as and for the purpose set forth.

C. V. STATLER.

Witnesses:
 A. MAYER,
 ZIMRI POND.